(12) United States Patent
Wang et al.

(10) Patent No.: US 7,617,482 B2
(45) Date of Patent: Nov. 10, 2009

(54) METHOD, SYSTEM AND PROGRAM PRODUCT FOR IMPLEMENTING JAVA SERVER PAGE (JSP) CONTAINERS AS JAVA SERVER FACES (JSF) COMPONENTS

(75) Inventors: Steve Wang, Cary, NC (US); Brendan Murray, Monasterboice (IE)

(73) Assignee: International Business Machines Corporation, Armonk, NY (US)

( * ) Notice: Subject to any disclaimer, the term of this patent is extended or adjusted under 35 U.S.C. 154(b) by 1143 days.

(21) Appl. No.: 10/991,893

(22) Filed: Nov. 18, 2004

(65) Prior Publication Data
US 2006/0112372 A1 May 25, 2006

(51) Int. Cl.
G06F 9/44 (2006.01)
(52) U.S. Cl. .................................. 717/115
(58) Field of Classification Search ............. 717/136, 717/168, 103, 115; 715/229
See application file for complete search history.

(56) References Cited

U.S. PATENT DOCUMENTS

| 6,604,209 B1 | 8/2003 | Grucci et al. |
| 6,697,849 B1 | 2/2004 | Carlson |
| 6,766,333 B1 | 7/2004 | Wu et al. |
| 6,766,477 B2 | 7/2004 | Grucci et al. |
| 7,165,243 B1 * | 1/2007 | Pelegri-Llopart et al. ... 717/136 |

FOREIGN PATENT DOCUMENTS

WO  WO 2004/055633 A2  7/2004

OTHER PUBLICATIONS

Armstrong et al, "J2EE 1.4 Tutorial", Aug. 27, 2004, ch. 12, 17, 18 (hereinafter Armstrong) URL: <http://web.archive.org/web/20041013023912/java.sun.com/j2ee/1.4/docs/tutorial/doc/index.html> as file: J2ee1.4_tutorial.pdf.*
Ping et al., "Migration of Legacy Web Applications to Enterprise Java Environments—Net.Data to JSP Transformation", pp. 1-15, 2003.
Liu et al., "Mapping Component Specifications to Enterprise JavaBeans Implementations", ACM Southeast Conference 2004, Apr. 2-3, 2004.
Inspec, Spitzer et al., "Delivering Enterprise JavaBeans Building and Deploying a Polling Application with EJB", AN 6242265, 1999.

* cited by examiner

*Primary Examiner*—Tuan Anh Vu
(74) *Attorney, Agent, or Firm*—Hoffman Warnick LLC

(57) ABSTRACT

The present invention provides a method, system and program product for implementing a JSP container as a JSF component. Specifically, under the present invention, a bridging JSP is introduced between a JSP container and a JSF runtime. The JSF runtime "renderer" will pass parameters needed for implementing/rendering the JSP container as a JSF component to the bridging JSP. Upon receipt, the JSP bridging will implement/render the JSP container as a JSF component using the parameters.

6 Claims, 3 Drawing Sheets

METHOD, SYSTEM AND PROGRAM PRODUCT FOR IMPLEMENTING JAVA SERVER PAGE (JSP) CONTAINERS AS JAVA SERVER FACES (JSF) COMPONENTS

BACKGROUND OF THE INVENTION

1. Field of the Invention

In general, the present invention relates to transformation of JSP containers that are self-contained widgets or components. Specifically, the present invention relates to a method, system and program product for implementing JSP containers as JSF components.

2. Related Art

As the new Java Server Faces (JSF) standard rapidly gains popularity in the industry as an application framework, its function of server-side componentization creates a need to convert existing Java Server Page (JSP) containers into JSF components. Specifically, with the acceptance of JSF as a new standard, and its use of server-side componentization techniques, there is a need to implement containers such as JSP custom tag library containers as JSF components.

Prior to JSF, many Web applications were developed using JSP custom tag libraries. One such example is the International Business Machines (IBM) Rich Text Editor. One possible solution for converting JSP containers such as this into JSF component is to "break up" the containers and re-implement them in a JSF-compliant manner. However, to re-implement a JSP container as a JSF component in this manner is often impossible cost-wise or because there is no access to the original container's source code. Moreover, it is often not possible to run the JSP container directly from a JSF runtime because the JSP container runs in a user-application context, while the JSF runtime has its own context.

One approach, which is referred to herein as a container-based approach, could be to componentize the JSP library as a whole, without modifying the JSP container itself. This method would have the advantage of preserving the original JSP container, thereby reducing cost. Furthermore, as indicated above, it is usually the case that developers do not have access to the JSP containers themselves. As such, there is little chance of re-implementing the JSP containers as JSF components. To this extent, a container-based method would be the only viable mechanism to transform a JSP container to a JSF component. Unfortunately, no existing approach provides a container-based approach. Rather, all existing solutions rely on access to and manipulation of the source code for the JSP container.

In view of the foregoing, there exists a need for a method, system and program product for implementing JSP containers as JSF components. Specifically, a need exists for a container-based approach for this re-implementation that does not require access to or manipulation of the underlying source code of the JSP container.

SUMMARY OF THE INVENTION

In general, the present invention provides a method, system and program product for implementing JSP containers as JSF components. Specifically, under the present invention, a bridging JSP is introduced between a JSP container and a JSF runtime. The JSF runtime "renderer" will pass parameters needed for implementing/rendering the JSP container as a JSF component to the bridging JSP. Upon receipt, the JSP bridging will implement/render the JSP container as a JSF component using the parameters.

A first aspect of the present invention provides a method for implementing Java Server Page (JSP) containers as Java Server Faces (JSF) components, comprising: providing a bridging JSP between a JSP container and a JSF runtime; passing parameters for implementing the JSP container as a JSF component from the JSF runtime to the JSP bridging; and implementing the JSP container as the JSF component from the JSP bridging using the parameters.

A second aspect of the present invention provides a system for implementing Java Server Page (JSP) containers as Java Server Faces (JSF) components, comprising: a JSP container; a JSF runtime; and a JSP bridging interposed between the JSP container and the JSF runtime, wherein the JSP bridging receives parameters from the JSF runtime for implementing the JSP container as a JSF component, and wherein the JSP implements the JSP container as the JSF component using the parameters.

A third aspect of the present invention provides a program product stored on a recordable medium for implementing Java Server Page (JSP) containers as Java Server Faces (JSF) components, which when executed, comprises: program code for receiving parameters for implementing a JSP container as a JSF component from a JSF runtime; and program code for implementing the JSP container as the JSF component using the parameters.

A fourth aspect of the present invention provides a method for deploying an application for implementing Java Server Page (JSP) containers as Java Server Faces (JSF) components, comprising: providing a computer infrastructure being operable to receive parameters for implementing a JSP container as a JSF component from a JSF runtime; and implement the JSP container as the JSF component using the parameters.

A fifth aspect of the present invention provides computer software embodied in a propagated signal for implementing Java Server Page (JSP) containers as Java Server Faces (JSF) components, the computer software comprising instructions to cause a computer system to perform the following functions: receive parameters for implementing a JSP container as a JSF component from a JSF runtime; and implement the JSP container as the JSF component using the parameters.

Therefore, the present invention provides a method, system and program product for implementing JSP containers as JSF components.

BRIEF DESCRIPTION OF THE DRAWINGS

These and other features of this invention will be more readily understood from the following detailed description of the various aspects of the invention taken in conjunction with the accompanying drawings in which.

Figure 1:
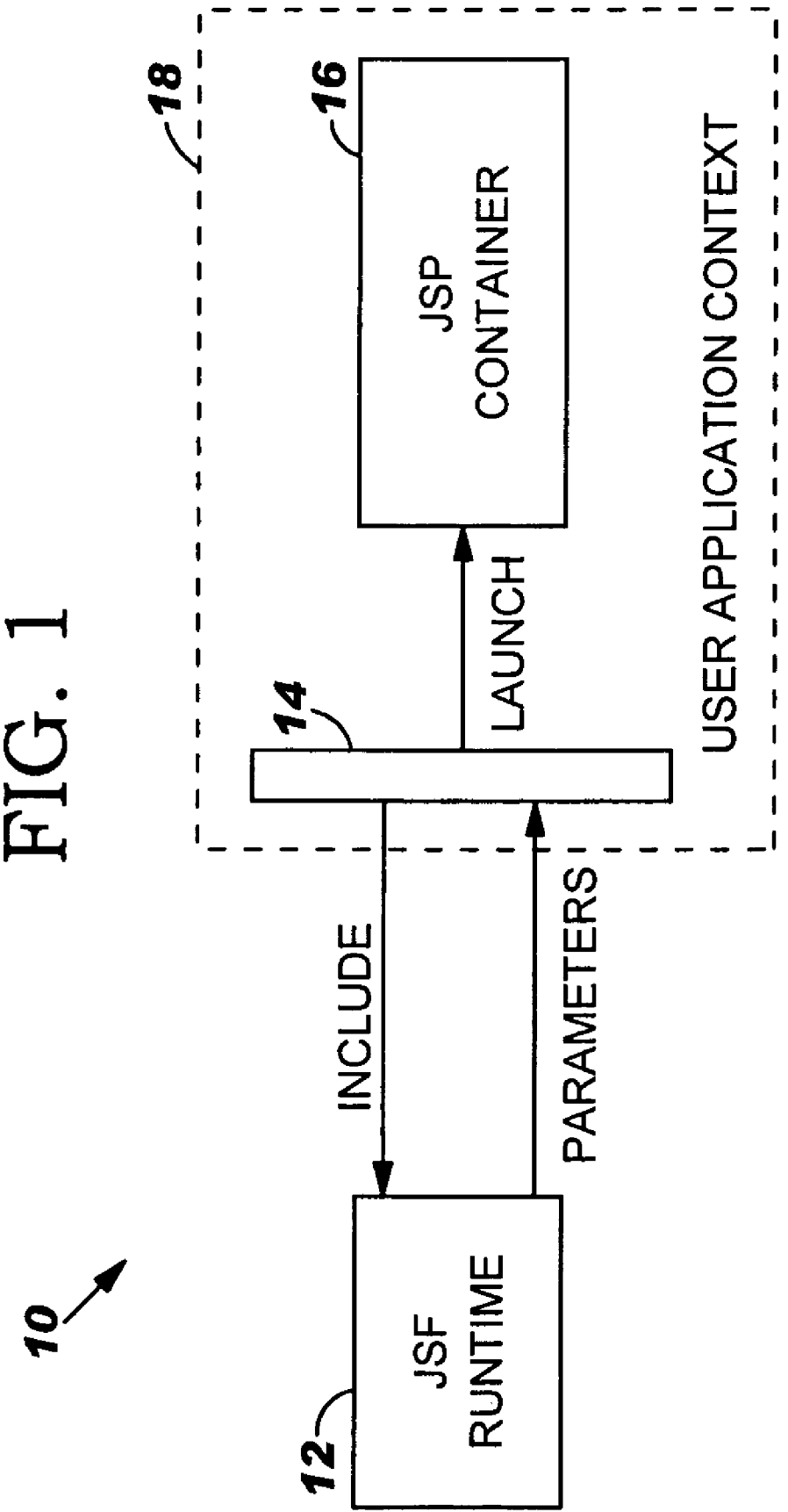
FIG. 1 depicts a system for implementing JSP containers as JSF components according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience purposes, the Detailed Description of the Drawings will have the following sections:

I. General Description
II. Computerized Implementation

I. General Description

As indicated above, the present invention provides a method, system and program product for implementing JSP containers as JSF components. Specifically, under the present invention, a bridging JSP is introduced between a JSP container and a JSF runtime. The JSF runtime "renderer" will pass parameters needed for implementing/rendering the JSP container as a JSF component to the bridging JSP. Upon receipt, the JSP bridging will implement/render the JSP container as a JSF component using the parameters.

Referring now to FIG. 1, a system 10 for implementing a JSP container as a JSF component is shown. As depicted, system 10 includes JSF runtime 12, bridging JSP 14 and JSP container 16. As further depicted, bridging JSP 14 and JSP container 16 are both implemented within a user application context 18 that is separate from JSF runtime 12. As indicated above, the growing pervasiveness of the JSF standard has brought a desire to implement JSP containers as JSP components. Heretofore, the only way to accomplish this was to access the source code for the JSP container itself, which is not always preferable or even possible. Under the present invention, bridging JSP 14 is interposed between JSP container 16 and JSF runtime 12. As will be further explained below, bridging JSP 14 allows JSP container 16 to be implemented/rendered as a JSF component without having to access its source code. Moreover, as will be further explained below in conjunction with FIG. 3, system 10 can be implemented within a single "tooling environment" such as WebSphere Application Studio, which is commercially available from International Business Machines (IBM) Corp. of Armonk, N.Y.

For purposes of an illustrative example, assume that JSP container 16 is a custom tag library. Further assume that user application context 18 is IBM's Rich Text Editor. Since JSP container 16 runs within user application context 18, JSP container 16 cannot be run directly from JSF runtime 12. Under the present invention, bridging JSP 14 will be passed any parameters (e.g., tag attributes, page context, etc.) needed to render/implement/run JSP container 16 as a JSF component. Examples of these parameters are shown below:

```
<% String name=(String)request.getAttribute ("rte_name");
    %>
<% String jspContext=(String)request.getContextPath( )+"/
    "; %>
<% String jsp=(String)request.getAttribute ("rte_jsp"); %>
<% String mode=(String)request.getAttribute ("rte_mode");
    %>
<% String locale=(String)request.getAttribute ("rte_lo-
    cale"); %>
<% String imageDirectory=(String)request.getAttribute
    ("rte_imageDirectory"); %>
<% String width=(String)request.getAttribute ("rte_width");
    %>
<% String height=(String)request.getAttribute ("rte-
    _height"); %>
<% String listener=(String)request.getAttribute ("listener");
    %>
<% String formName=(String)request.getAttribute ("rte-
    _formName"); %>
<% String formItem=(String)request.getAttribute ("rte_for-
    mItem"); %>
<% String jspPath=jspContext+".ibmjsfres/DocEditor/"; %>
<% String mozPath=getProtocolHostPortPrefix(request)+
    jspPath; %>
```

Specifically, JSF runtime 12 (e.g., the runtime renderer) will render a visual (e.g., Hypertext Markup Language "HTML") for JSP container 16 as a JSF component. Parameters of this visual are then passed to JSP bridging 14, which is invoked from JSF runtime 12. Upon receipt, JSP bridging 14 will implement/render JSP container 16 as a JSF component using the parameters.

Figure 2:
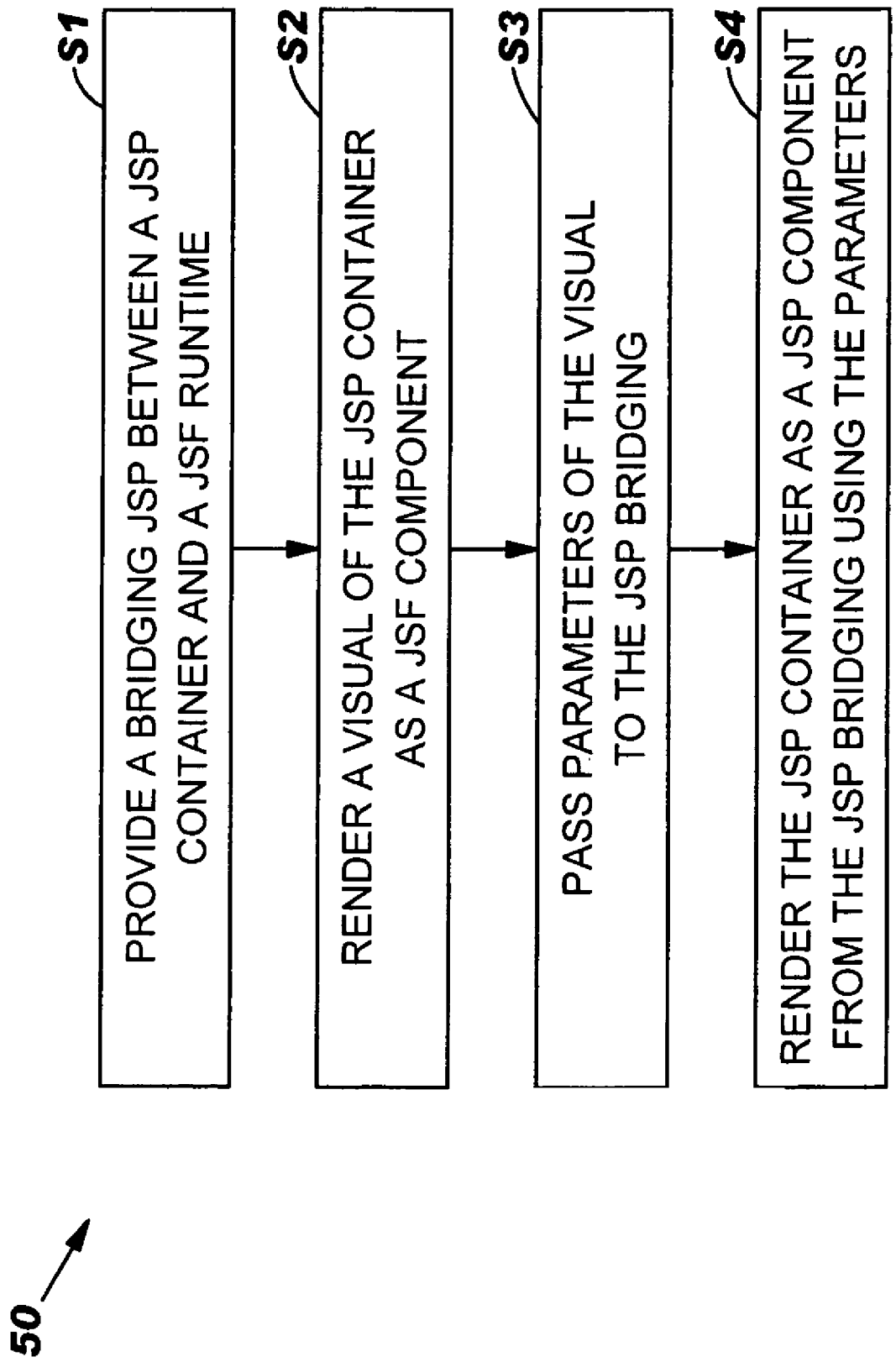
FIG. 2 depicts a method flow diagram according to the present invention.

Referring now to FIG. 2, a method flow diagram 50 according to the present invention is shown. As depicted, in first step S1 is to provide a JSP bridging between a JSP container and a JSF runtime. Second step S2 is to render a visual of the JSP container as a JSF component. Third step S3 is to pass parameters of the visual (e.g., for rendering the JSP container as the JSF component) from the JSF runtime to the JSP bridging. Fourth step S4 is to render the JSP container as a JSF component from the JSP bridging using the parameters.

II. Computerized Implementation

Figure 3:
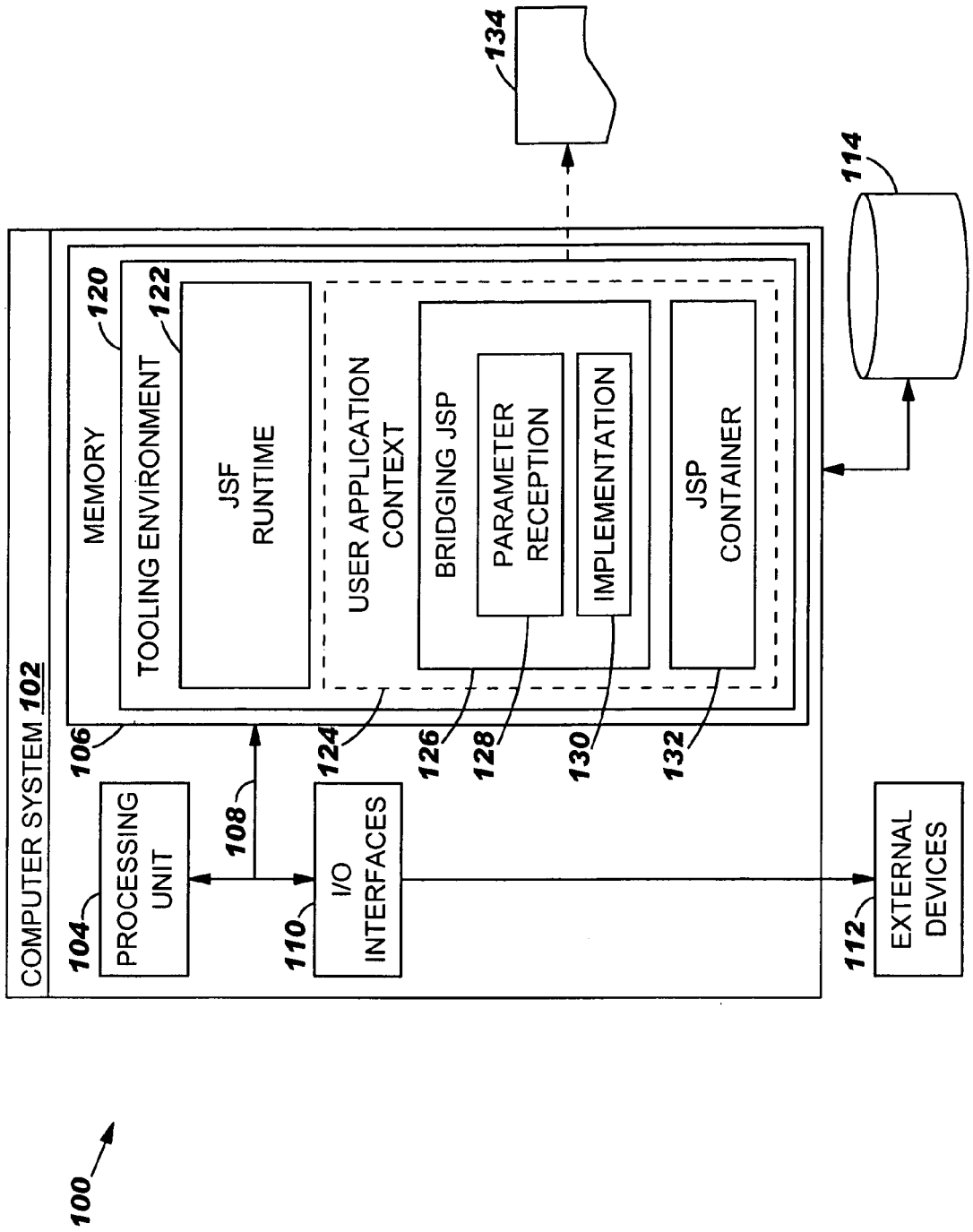
FIG. 3 depicts a computerized implementation of the present invention.

Referring now to FIG. 3, a more specific computerized implementation 100 of the present invention is shown. As depicted, computer system 102 is provided, which is intended to represent any type of computer system capable of carrying out the teachings of the present invention. For example, computer system 102 can be a desktop computer, a laptop computer, a workstation, a handheld device, a client, a server, etc. To this extent, the teachings of the present invention can be implemented via a stand-alone system as shown, or over a network such as the Internet, a local area network (LAN), a wide area network (WAN), a virtual private network (VPN), etc. In the case of the latter, communication throughout the network could occur via a direct hardwired connection (e.g., serial port), or via an addressable connection that may utilize any combination of wireline and/or wireless transmission methods. Conventional network connectivity, such as Token Ring, Ethernet, WiFi or other conventional communications standards could be used. Still yet, connectivity could be provided by conventional IP-based protocol. In this instance, an Internet service provider could be used to establish interconnectivity.

As further shown, computer system 102 generally includes processing unit 104, memory 106, bus 108, input/output (I/O) interfaces 110, external devices/resources 112 and storage unit 114. Processing unit 104 may comprise a single processing unit, or be distributed across one or more processing units in one or more locations, e.g., on a client and server. Memory 106 may comprise any known type of data storage and/or transmission media, including magnetic media, optical media, random access memory (RAM), read-only memory (ROM), a data cache, a data object, etc. Moreover, similar to processing unit 104, memory 106 may reside at a single physical location, comprising one or more types of data storage, or be distributed across a plurality of physical systems in various forms.

I/O interfaces 110 may comprise any system for exchanging information to/from an external source. External devices/resources 112 may comprise any known type of external device, including speakers, a CRT, LED screen, hand-held device, keyboard, mouse, voice recognition system, speech output system, printer, monitor/display, facsimile, pager, etc. Bus 108 provides a communication link between each of the components in computer system 102 and likewise may comprise any known type of transmission link, including electrical, optical, wireless, etc.

Storage unit 114 can be any type of system (e.g., a database) capable of providing storage for information (e.g., JSP containers, JSF components, etc.) under the present invention. As such, storage unit 114 could include one or more storage devices, such as a magnetic disk drive or an optical disk drive. In another embodiment, storage unit 114 includes data distributed across, for example, a local area network (LAN), wide area network (WAN) or a storage area network (SAN) (not shown). Although not shown, additional components, such as cache memory, communication systems, system software, etc., may be incorporated into computer system 102.

Shown in memory 106 of computer system 102 is tooling environment 120, which is intended to represent any type of tooling environment such as WebSphere Application Studio. Shown within tooling environment 120 is JSF runtime 122, bridging JSP 126 and JSP container 132. Moreover, similar to FIG. 1, bridging JSP 126 and JSP container 132 are maintained within user application context 124. As indicated above, the present invention allows a JSP container 132 to be rendered/run/implemented as a JSF component 134. To this extent, JSF runtime 122 will first render a visual of JSP container 132 as a JSF component 134. Parameters of this visual are then passed to parameter reception system 128 of bridging JSP 126. Once received, the parameters will be used by implementation system 130 of bridging JSP 126 to implement/render JSP container 132 as JSF component 134.

It should be appreciated that the present invention could be offered as a business method on a subscription or fee basis. For example, computer system 102, bridging JSP 126, etc. could be created, supported, maintained and/or deployed by a service provider that offers the functions described herein for customers. That is, a service provider could offer to implement JSP containers as JSF components for customers.

It should also be understood that the present invention could be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, bridging JSP 126 is shown with a certain configuration of sub-systems for illustrative purposes only.

We claim:

1. A method for implementing Java Server Page (JSP) containers as Java Server Faces (JSF) components, comprising:
   implementing a JSP bridging between a JSP container and a JSF runtime, wherein the JSP container includes a JSP custom tag library container, and wherein the JSP bridging and the JSP container are implemented within a user application context;
   implementing the JSP container as the JSF component from the JSP bridging by passing parameters for the JSP container to the JSP bridging, wherein the parameters comprise tag attributes and page context of the JSP custom tag library;
   invoking the JSF runtime from the JSP bridging to render a visual of the JSP container as the JSF component.

2. The method of claim 1, wherein the method is implemented within a tooling environment that includes the JSP bridging and the JSP container.

3. A system for implementing Java Server Page (JSP) containers as Java Server Faces (JSF) components, comprising:
   a computer including:
   a JSP container that includes a JSP custom tag library container;
   a JSF runtime; and
   a JSP bridging interposed between the JSP container and the JSF runtime, wherein the JSP bridging receives parameters that include tag attributes and page context of the JSP custom tag library from the JSP container, wherein the JSF runtime renders a visual of the JSP container as the JSF component from the JSP bridging wherein the JSP container and the JSP bridging are implemented within a user application context, and wherein the JSP bridging is invoked from the JSF runtime.

4. The system of claim 3, wherein the JSP bridging and the JSP container are implemented within a tooling environment.

5. A computer readable medium having a program product stored thereon for implementing Java Server Page (JSP) containers as Java Server Faces (JSF) components, which when executed, comprises:
   program code for passing parameters to a JSP bridging for implementing a JSP container as a JSF component, wherein the parameters comprise tag attributes and page context from a JSP custom tag library container, and wherein the JSP container comprises the JSP custom tag library container;
   program code for invoking the JSF runtime by rendering a visual of the JSP container as the JSF component from the JSP bridging; and
   wherein the JSP bridging is interposed between the JSP container and the JSF runtime, and wherein JSP container and the JSP bridging are implemented within a user application context.

6. The system of claim 4, wherein the tooling environment comprises WebSphere Application Studio.

\* \* \* \* \*

UNITED STATES PATENT AND TRADEMARK OFFICE
CERTIFICATE OF CORRECTION

PATENT NO. : 7,617,482 B2
APPLICATION NO. : 10/991893
DATED : November 10, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1392 days.

Signed and Sealed this

Nineteenth Day of October, 2010

David J. Kappos
*Director of the United States Patent and Trademark Office*